United States Patent [19]

Tatsuno et al.

[11] Patent Number: 4,759,628
[45] Date of Patent: Jul. 26, 1988

[54] WAVELENGTH SCANNING INTERFEROMETRY AND INTERFEROMETER EMPLOYING LASER DIODE

[75] Inventors: Kimio Tatsuno, Fuchu; Yoshito Tsunoda, Mitaka; Masatoshi Ohtake, Ome; Keiji Kataoka, Kawagoe; Seiji Yonezawa, Hachioji, all of Japan

[73] Assignee: Hitachi, Ltd., Tokyo, Japan

[21] Appl. No.: 826,341

[22] Filed: Feb. 5, 1986

[30] Foreign Application Priority Data

Mar. 6, 1985 [JP] Japan ................................. 60-42642

[51] Int. Cl.[4] ............................................. G01B 9/02
[52] U.S. Cl. ...................................... 356/349; 356/360
[58] Field of Search ........................ 356/349, 359, 360

[56] References Cited

U.S. PATENT DOCUMENTS 3,635,562  1/1972  Catherin ........................ 356/358 X
4,594,003  6/1986  Sommargren ........................ 356/349

*Primary Examiner*—Davis L. Willis
*Assistant Examiner*—Matthew W. Koren
*Attorney, Agent, or Firm*—Antonelli, Terry & Wands

[57] ABSTRACT

In an interferometry wherein a light beam from a light source is divided in two, one of which is used as a reference beam and the other beam is used as an inspecting beam, and the two beams are projected again on an identical plane so as to form an interference pattern; a wavelength scanning type laser diode interferometry characterized in that a laser diode is employed as the light source, and that an injection current of the laser diode is modulated thereby to scan a wavelength of the laser diode and to change an intensity distribution of the interference pattern.

11 Claims, 5 Drawing Sheets $$OUT = -\frac{10Z}{X}$$

WAVELENGTH SCANNING INTERFEROMETRY AND INTERFEROMETER EMPLOYING LASER DIODE

BACKGROUND OF THE INVENTION

The present invention relates to optical interferometry and an interferometer utilizing the interference phenomenon of laser beams. More particularly, it relates to a wavelength scanning interferometry and an interferometer with a laser diode that is well-suited for application to, e.g., the inspection of optical elements of which a high precision is required for reading an interference pattern.

In a prior-art optical interferometer, the wavelength of a light source is fixed, and a method such as providing a beam with a frequency shifter or modulating the phase of light by means of a piezoelectric device is employed for raising the reading precision of an interference pattern. However, both the devices for providing these methods are expensive. Other disadvantages are that a large number of components of these systems must be adjusted and that a driving power source of high voltage is required.

More specifically, in a prior art optical interferometer based on the so-called heterodyne interference method, the wavelength of a light source is fixed. In order to measure the phase of the wavefront between interference fringes, a method is employed in which the wavelength of a beam is shifted by a frequency modulator or in which a piezoelectric device is mounted on a mirror so as to perform phase modulation. Both of the methods, however are disadvantageous in that the modulation devices are expensive and require high voltages. The latter method involves complicated handling for the corrections of a nonlinearity and a hysteresis, etc.

SUMMARY OF THE INVENTION

An object of the present invention is to eliminate the disadvantages described above, and to provide a laser diode interferometer which is inexpensive and easy to operate permits an electrical read of an interference pattern and performs interference pattern processing with high precision.

The present invention consists in that a laser diode is employed as the light source of an interferometer of the Fizeau type, the Michelson type, the Twyman-Green type, the Mach-Zehnder type or the like and that the drive current of the laser diode is modulated to scan the wavelength thereof, thereby to scan an interference pattern and to enhance the reading precision of the interference pattern. That is, with note taken of the unstable characteristic of a laser diode that the wavelength thereof changes delicately depending upon the amount of current applied, the present invention consists in that the wavelength of the laser diode itself is changed by utilizing this characteristic. According to the present invention, the whole apparatus is miniaturized. The accuracy can be significantly increased, and the required power can be substantially decreased. The present invention can measure an object as minute as 0.00001 mm. The present invention can measure a lens, a mirror etc. and also the front of the light wave of a laser source, and is extensively applicable to the design of laser devices, etc.

As another feature of the present invention, the quantity of light having fluctuated due to the change of the drive current of a laser diode is monitored, and the fluctuation of the intensity distribution of an interference pattern is normalized, to perform electric processing of higher precision.

BRIEF DESCRIPTION OF THE DRAWINGS

FIG. 9(a) is a circuit diagram showing an example of a laser diode driver circuit for use in the present invention, while

DESCRIPTION OF THE PREFERRED EMBODIMENTS

Figure 1:
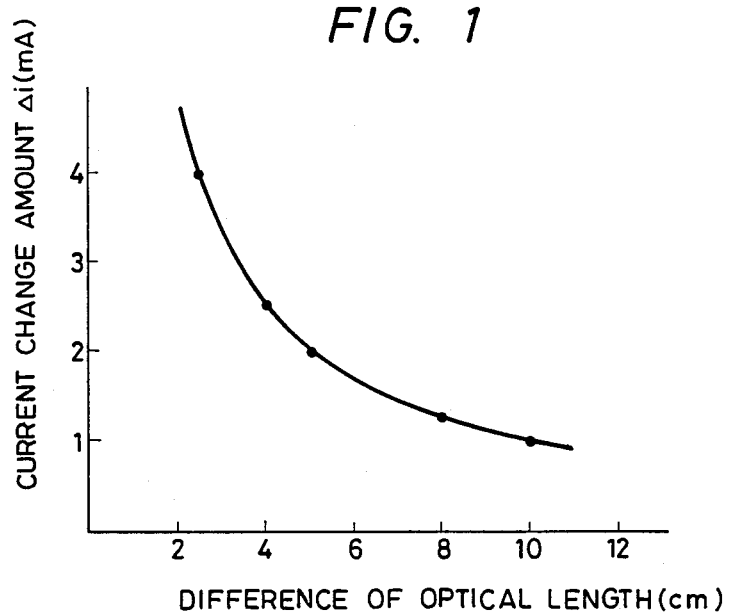
FIG. 1 is a graph showing the amount of current change which is required for shifting the wavelength of a laser diode by one wavelength, versus the difference of the optical lengths of the two light beams of an interferometer.

First, the principle of the present invention will be described.

In general, in a laser diode, when the drive current is changed by $\Delta I(mA)$, the wavelength shifts. For example, in case of a channeled substrate planar type laser diode, the shift magnitude $\Delta \lambda$ of the wavelength is given by:

$$\Delta \lambda = 0.006 \cdot \Delta I (nm) \qquad (1)$$

On the other hand, the complex amplitude of light at an arbitrary point (x, y) on an interference pattern is given on the time average by:

$$V(x, y) = u_0(x, y) \exp\{ik \cdot r_0(x, y)\} + u_r(x, y) \exp\{ik \cdot r_r(x, y)\}$$

Here, $u_0$ and $u_r$ denote the amplitudes of an object beam and a reference beam respectively, $r_0$ and $r_r$ denote the optical lengths of the object beam and the reference beam from a reference plane respectively, and k denotes a wave number which is given by:

$$k = \frac{2\pi}{\lambda}$$

From the above, the intensity distribution is:

$$I(x,y) = |V(x,y)|^2$$
$$= u_0^2(x,y) + u_r^2(x,y) +$$
$$2u_0 \cdot u_r \cdot \cos\left(\frac{2\pi}{\lambda}(r_0 - r_r)\right)$$

Accordingly, an interference pattern is obtained which has the maximum intensity at a point (x, y) satisfying $$\frac{2\pi}{\lambda}\{r_0(x,y) - r_r(x,y)\} = m \quad (m: \text{integer})$$

and the minimum intensity at a point satisfying $$\frac{2\pi}{\lambda}\{r_0(x,y) - r_r(x,y)\} = \frac{\pi}{2} \cdot m \quad (m: \text{integer})$$

That is, the intensity distribution I(x, y) is:

$$I(x, y) = I_0[1 + \gamma \cos\{\Phi(x, y)\}] \tag{2}$$

Here, $$I_0 = u_0^2(x, y) + u_r^2(x, y)$$

$$\gamma = 2u_0 \cdot u_r / \{u_0^2(x, y) + u_r^2(x, y)\}$$

$$\Phi(x,y) = \frac{2\pi}{\lambda}(r_0 - r_r) = \frac{2\pi}{\lambda} \cdot l$$

$\Phi(x, y)$ is the phase of a wavefront to be measured, and l is the optical path difference at the point (x, y).

Now, scanning the interference pattern by one wavelength ($2\pi$ phase) will be considered. Assuming that there be n waves within the difference of the optical lengths of the two beams, the difference being:

$$l = r_0(x, y) - r_r(x, y)$$

the following holds:

$$n \cdot \lambda = l \tag{3}$$

Meanwhile, as stated above, the wavelength $\lambda$ of the laser diode fluctuates when the injection current i is changed. Now, when the injection current is changed linearly with time ($\Delta i = \alpha \cdot t$), the wavelength slightly shifts ($\Delta\lambda$) as:

$$\Delta\lambda = \beta \cdot \Delta i = \beta \cdot \alpha \cdot t \quad (\alpha, \beta: \text{constants}) \tag{4}$$

($\beta \approx 0.0006$).

When the drive current I of the laser diode is increased to shift the wavelength by $\Delta\lambda$ in the direction of a longer wavelength, (n−1) waves exist within the optical path difference l, and hence, the following holds:

$$(n-1)(\lambda + \Delta\lambda) = l \tag{5}$$

When n is eliminated from Eqs. (3) and (5), $$l = \frac{\lambda^2}{\Delta\lambda} \tag{6}$$

is obtained.

Using a differential coefficient, the above will be explained more thoroughly.

As to the very small change $\Delta\lambda$ of the wavelength, the phase $\Phi$ of the foregoing wavefront can be written as:

$$\Phi(x, y, t) = 2\pi \cdot l/\lambda \tag{7}$$
$$= 2\pi \cdot l/\lambda_0 - (2\pi \cdot l/\lambda_0^2)\Delta\lambda$$
$$= \Phi_0 - \Delta\Phi$$

$\lambda_0$ denotes the initial wavelength.

Here, the phase shift $\Delta\Phi$ is:

$$\Delta\Phi = (2\pi \cdot l/\lambda_0^2)\Delta\lambda \tag{8}$$

and Eq. (6) is given for a shift of $2\pi$.

From Eqs. (1) and (6), $$\Delta i = 100/l \, (mA) \tag{9}$$

Eq. (9) gives the current change $\Delta i$ for shifting the interference pattern by one fringe in the interferometer of the optical length difference l.

FIG. 1 illustrates this relationship graphically. For example, when the difference of optical lengths is 10 cm, the current change amount becomes $\Delta i = 1$ mA. The operating median of a diode laser is usually 60–100 mA as illustrsated in FIG. 2. It is therefore understood that the wavelength scanning is possible with a very slight current modulation. In addition, the change of the light output is very slight for such a current change.

Figure 3:
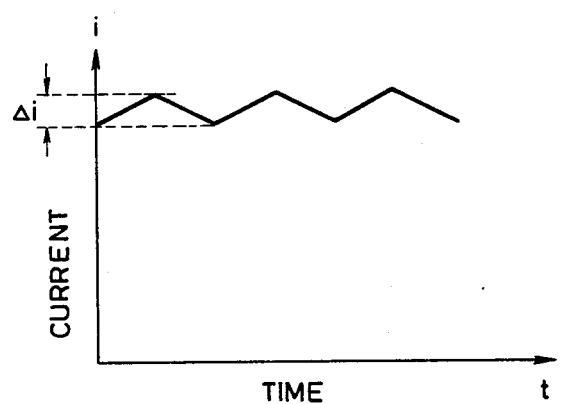
FIG. 3 is a diagram showing the change of the injection current of a laser diode.
Figure 4:
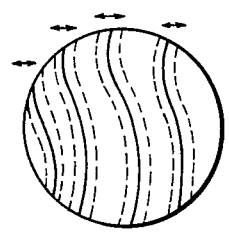
FIG. 4 is a diagram showing the change of an interference pattern.
Figure 5:
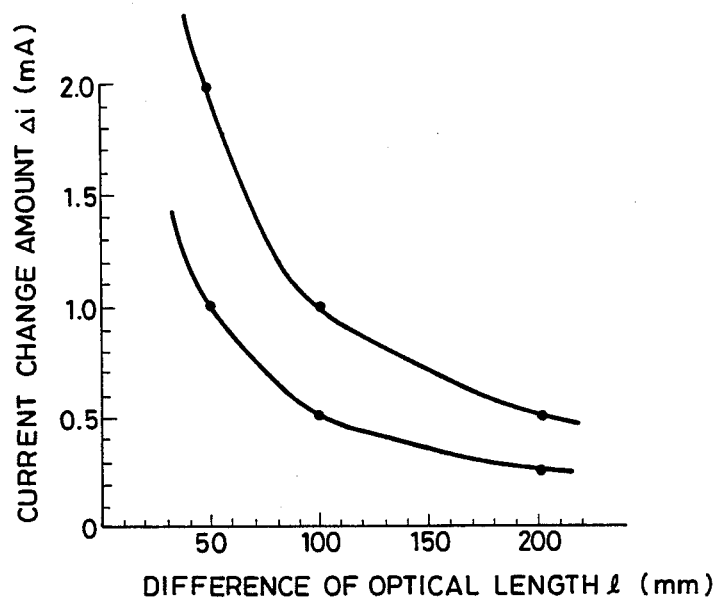
FIG. 5 is a graph showing the relationship between the difference of optical lengths and the amount of injection current change.

This can be explained as follows. When the injection current i of a laser diode 1 is changed as shown in FIG. 3, the interference pattern starts reciprocative scanning as indicated by arrows in FIG. 4. It is understood from Eq. (7) that the amount of change of the injection current required for shifting the interference pattern by one fringe depends upon the difference of optical lengths. More specifically, when substituting $$\Delta\Phi = 2\pi$$

in Eq. (8), $$\Delta i = \frac{1}{\beta} \cdot \frac{\lambda_0^2}{l}$$

holds. This value is the current change amount affording the one-fringe shift in the case of a single-path interferometer, and ½ thereof is the change amount in the case of a double-path interferometer. These relationships are illustrated in FIG. 5, and the constant $\beta$ is experimentally determined. When the optical path difference is l=100 mm, the injection current change amount is $\Delta i = 1.0$ mA, and the interference scanning of one fringe is possible. Needless to say, half of the above suffices for the inteferometer of the double path type.

Referring to the original equation (7), the mathematical expressions can be developed.

In combination with Eq. (4), the very small change $\Delta\Phi$ of the phase is:

$$\Delta\Phi = (2\pi \cdot l/\lambda_0^2)\beta \cdot \Delta i \tag{10}$$
$$= 2\pi f t$$

This affords the basic signal of the heterodyne interferometry. Here, the following holds:

$$f = (2\pi \cdot l/\lambda_0^2)\beta \cdot \alpha \quad (11)$$

Now, consider the reception and photoelectrical conversion of the interference pattern by means of a two-dimensional photodiode array such a CCD (charge coupled device). Since the intensity change of the interference pattern on one element of the CCd is given by Eqs. (2), (7) and (10), the photocurrent $I_p$ is given by:

$$I_p(x, y, t) = I_0[1 + \gamma \cos\{\Phi(x, y, t)\}]$$

$$\Phi(x, y, t) = \Phi_0(x, y) - 2\pi f t \quad (12)$$

This is called the 'heterodyne signal'.

As understood from Eq. (10), when the difference l of the optical lengths of the reference beam and the object beam is zero, the heterodyne signal is not obtained even by changing the injection current i. In addition, when the optical length difference l is small, a sufficient phase change is not obtained unless the change of the injection current is increased. However, when the injection current is greatly changed, the light output itself of the laser diode changes, so that $I_0$ changes in Eq. (2), making it impossible to obtain the original heterodyne signal (12).

Therefore, the second point of the present invention consists in obtaining the normalized interference pattern intensity distribution as in the following equation:

$$I_p' = \frac{I_p}{I_0} = 1 + \gamma \cos\{\Phi(x, y, t)\} \quad (13)$$

by monitoring the quantity of light $I_0$ of the laser diode and dividing the photocurrent $I_p$ by the monitored current. That is, dividers are connected to the respective elements of the CCD.

Figure 6:
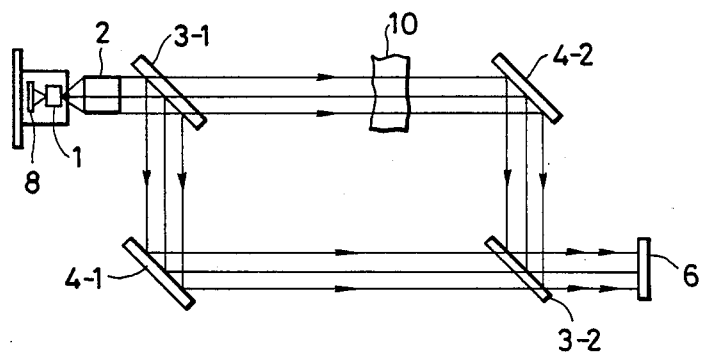
FIG. 6 is a diagram of the application of the present invention to a Mach-Zehnder interferometer.

FIG. 6 is a diagram showing an embodiment of the present invention, and illustrates the case of a Mach-Zehnder type interferometer. This inteferometer employs a laser diode 1 as a light source. A light beam from this diode laser is turned by a condenser lens 2 into a collimated beam, which is split into two beams by a beam splitter 3-1. One of the beams is used as a beam for inspection, in which a transmissive object 10 to be measured is placed and which is reflected by a reflector mirror 4-2 and is combined via a second beam splitter 3-2 with the other beam (reference beam) from a reflector mirror 4-1 to form an interference pattern on a photodetector 6 of a two-dimensional photosensor array (CCD). The difference between the optical lengths of the two beams can be adjusted by rotating the beam splitter 3-1 and moving the reflector mirror 4-1.

Figure 7:
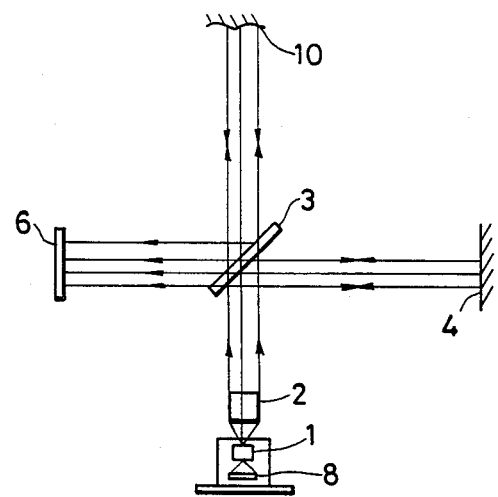
FIG. 7 is a diagram of the application of the present invention to a Twyman-Green interferometer.

FIG. 7 is a diagram showing another embodiment of the present invention, in which the invention is applied to a Twyman-Green type interferometer. A beam from a light source constructed of a laser diode 1 is turned by a condenser lens 2 into a collimated beam, which is split into two beams by a beam splitter 3. One of the beams to serve as a reference beam is reflected by a reflector mirror 4, and is transmitted through the beam splitter 3 to fall on a photodetector (CCD) 6. The beam transmitted through the beam splitter 3 is employed as an inspection beam. This beam is reflected by an object to-be-inspected 10 and is further reflected by the beam splitter 3, to form an interference pattern on the photodetector (CCD) 6 conjointly with the reference beam.

In this embodiment, the difference of the optical lengths of the two beams can be adjusted by moving the reflector mirror 4 in the direction of the optic axis thereof.

Figure 8:
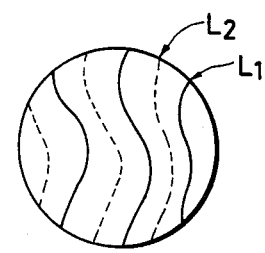
FIG. 8 is a diagram showing an example of an interference pattern according to the present invention.

FIG. 8 is a diagram showing an example of the interference pattern obtained with this interferometer. In the figure, the spacing between interference fringes $L_1$ (indicated by a solid line) and $L_2$ (indicated by a dotted line) corresponds to the shift of a wavefront equal to one wavelength. In case of changing the wavelength of the laser diode 1 from $\lambda_1$ to $\lambda_2$, the interference fringe $L_1$ appears for the wavelength $\lambda_1$ and the interference fringe $L_2$ appears for the wavelength $\lambda_2$, so that the interference fringe moves. When the current of the laser diode 1 is modulated by a triangular wave of frequency $\omega$ and amplitude $\Delta i$ as shown in FIG. 3 and is photoelectrically converted by the photodetector 6 so as to obtain data, the resulting signal is passed through a filter which has the pass frequency f given by Eq. (11), whereby only the frequency component can be extracted as a signal of high signal-to-noise ratio. That is, an oscillating component attributed to the disturbance of the interferometer and the influences of temperature etc. can be eliminated, and the reading precision can be enhanced by repeating measurements a large number of times and irregularly and taking an average. Further, a phase distribution, after the error of the interferometer itself, i.e. the error of focusing, etc. have been subtracted, can be displayed by a contour map or the like.

Figure 9A:
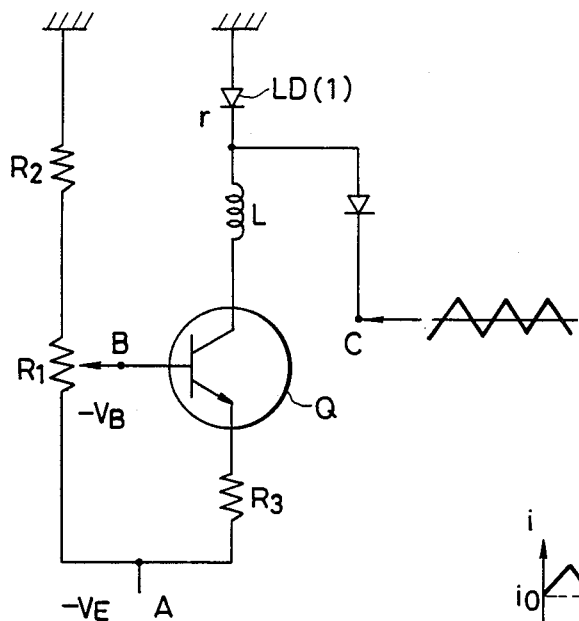
Figure 9B:
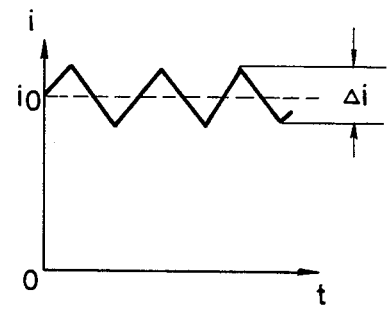
FIG. 9(b) is a signal waveform diagram thereof.

FIG. 9(a) is a circuit diagram showing an embodiment of a laser diode driver circuit for use in the present invention, while FIG. 9(b) is a signal waveform diagram thereof.

This circuit serves to modulate the semiconductor laser or laser diode LD (corresponding to the laser 1 in FIGS. 6 and 7) with an amplitude $\Delta i$ having a center value at a bias current $i_0$. When a voltage of $-V_E$ volts is applied to point A in the figure and a potential at point B (the base of a transistor Q) is set to $-V_B$ volts by a variable resistor $R_1$, the following voltage is applied across the laser diode LD:

$$V = (-V_B - 0.7) - (-V_E)$$

Consequently, a current $i_0 = V/(R_3 + r)$ where r denotes the resistance of the laser diode can be caused to flow through the D.C. resistance $R_3$, and the laser diode LD oscillates. The current of this value is used as the bias current.

The current modulation whose amplitude is $\Delta i$ is performed in such a way that a triangular wave of frequency $\omega$ as shown in FIG. 9(b) is externally input to a point C in the figure, and that the laser diode is driven by this modulating current.

Figure 2:
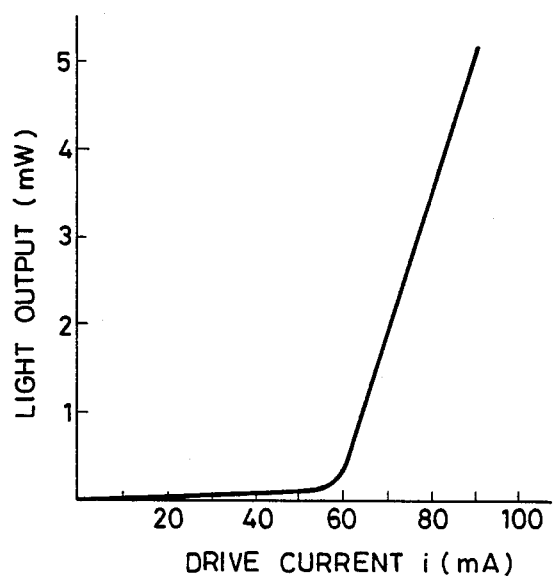
FIG. 2 is a graph showing the current—light output characteristic of a laser diode.

In this regard, as shown in FIG. 2, the light output of the laser diode changes when the injection current changes. Therefore, the light output of the laser diode 1 is monitored by means of a photodetector 8 disposed in a laser module, and the interference pattern intensity is normalized with the output thereof.

Figure 10:
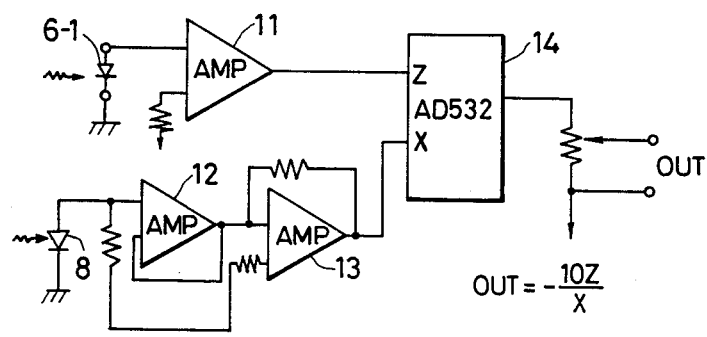
FIG. 10 is a diagram showing an example of a divider circuit.

A practical divider circuit therefor is shown in FIG. 10. A photocurrent based on the interference pattern intensity (the output of each element of the CCD 6) is input to the numerator Z of a divider commercially available, AD532 (manufactured by Analog Device Inc.), while a photocurrent derived from a light output behind the laser diode (the output of the photodetector 8) is input to the denominator X, thereby to perform the following division:

$$Z/X$$

With this method, the normalized interference pattern signal (Eq. (13)) is obtained.

More in detail, a signal from any element 6-1 of the CCD is input to the input terminal Z of the divider AD532 through an amplifier 11. On the other hand, the D.C. output light of the laser diode is received by the photodetector 8 and is input to the input terminal X of the divider 14 via two stages of amplifiers 12 and 13. As a result, an output signal Out is obtained:

$$\text{Out} = \frac{10Z}{X}$$

When this signal is multiplied by $-10$, $$Z/X$$

namely, $$\frac{I_p}{I_0} = 1 + \gamma\cos\Phi(x, y, t)$$

in Eq. (13) is obtained.

As described above, according to the present invention, the reading of an interference pattern at high precision is permitted merely by modulating the drive current of a laser-diode light source slightly.

Further, it becomes possible to perform with high precision the measurement of the wavefront of the spot of an optical head for use in the recording and reproduction of an optical disc and the measurement of an aberration inherent in the laser diode itself.

The above description has clarified that the interference scanning can be carried out without a piezoelectric device or a frequency shifter.

When the heterodyne signal obtained with Eq. (12) is applied to, for example, a signal processing method based on the integrated bucket technique developed by J. C. Wyant et al., it becomes possible to electrically evaluate the wavefront phase $\Phi(x, y)$ and to construct an interferometer system which can input data to a computer and which is higher in precision and more advantageous for data processing.

We claim:

1. A wavelength scanning type laser diode interferometer comprising:
   a laser diode for emitting a light beam, said laser diode being controlled by an injection current such that fluctuations in said light beam correspond to fluctuations in said injection current;
   monitoring means for monitoring said fluctuations in said light beam;
   means for dividing said light beam into a reference beam and an inspecting beam;
   means for recombining said reference beam and said inspecting beam into a recombined beam, and for projecting the recombined beam onto a two-dimensional photosensor array so as to form an interference pattern thereon; and
   normalizing means for dividing respective outputs of said two-dimensional photosensor array by an output from said monitoring means so as to normalize said interference pattern.

2. A wavelength scanning type laser diode interferometer according to claim 1, wherein said monitoring means comprises photodetecting means for detecting the light output of said laser diode.

3. A wavelength scanning type laser diode interferometer according to claim 1, wherein said two-dimensional photosensor array comprises a plurality of photoelements for detecting the intensity of said interference pattern and for outputting a photocurrent corresponding to said intensity.

4. A wavelength scanning type laser diode interferometer according to claim 3, wherein said normalizing means divides said photocurrent of each of said photoelements by an output current from said monitoring means so as to normalize said interference pattern.

5. A wavelength scanning type laser diode interferometer according to claim 1, wherein said injection current of said laser diode is modulated linearly with a predetermined period and with a predetermined amplitude.

6. A wavelength scanning type laser diode interferometer according to claim 5, wherein said injection current of said laser diode is modulated with a triangular wave.

7. A wavelength scanning type laser diode interferometer according to claim 1, wherein the wavelength of said light beam emitted by said laser diode is periodically changed by one interference fringe.

8. A wavelength scanning type laser diode interferometer comprising:
   a laser diode;
   a driver circuit for supplying said laser diode with a current whose amplitude changes periodically and linearly;
   a photosensor for receiving light from said laser diode;
   beam splitting means for splitting a light beam from said laser diode into a reference beam and an inspecting beam;
   beam combination means for combining said reference beam and said inspecting beam into a combined beam;
   a two-dimensional photo diode array for receiving said combined beam; and
   divider means disposed so as to correspond with respective outputs of said two-dimensional photo diode array for dividing the respective outputs of said two-dimensional photo diode array by an output from said photosensor so as to normalize an intensity distribution of an interference pattern formed on said two-dimensional photo diode array.

9. A wavelength scanning type laser diode interferometer according to claim 8, wherein said driver circuit generates a predetermined bias current on which a triangular wave is superposed.

10. A wavelength scanning type laser diode interferometer according to claim 8, wherein an amount of change of the amplitude of the current to be supplied from said driver circuit is so set that the wavelength of said laser diode is changed by one interference fringe.

11. A method of normalizing an interference pattern generated by a laser diode comprising the steps of:
    detecting the light intensity emitted by said laser diode;
    splitting a light beam output from said laser diode into a reference beam and an inspecting beam;
    combining said reference beam and said inspecting beam into a single beam;

projecting said single beam onto a two-dimensional photo-diode array, so as to form an interference pattern;

detecting light intensity of said interferrence pattern at a plurality of positions on said two-dimensional photo-diode array; and dividing said light intensity of said interference pattern on said two-dimensional photo diode array by said light intensity emitted by said laser diode, so as to normalize said interference pattern.

* * * * *